(12) United States Patent
Dass

(10) Patent No.: US 10,068,078 B2
(45) Date of Patent: Sep. 4, 2018

(54) ELECTRONIC DEVICES WITH IMPROVED IRIS RECOGNITION AND METHODS THEREOF

(71) Applicant: Microsoft Technology Licensing, LLC, Redmond, WA (US)

(72) Inventor: Shachindra Dass, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/883,869

(22) Filed: Oct. 15, 2015

(65) Prior Publication Data

US 2017/0109511 A1    Apr. 20, 2017

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |

(Continued)

(52) U.S. Cl.
CPC ......... G06F 21/32 (2013.01); G06K 9/00604 (2013.01); G06K 9/00617 (2013.01); G06K 9/00926 (2013.01); H04N 5/2256 (2013.01); H04N 5/2351 (2013.01); H04N 5/23293 (2013.01); H04N 5/33 (2013.01); H04W 12/06 (2013.01); G06K 9/00912 (2013.01)

(58) Field of Classification Search
CPC ........ G06F 21/32; G06F 21/36; H04W 12/06; G06K 9/00604; G06K 9/00617; H04N 5/33; H04N 5/2256; H04N 5/2329; H04N 5/2351

USPC .......................................................... 726/18
See application file for complete search history.

(56) References Cited

U.S. PATENT DOCUMENTS

| | | | |
|---|---|---|---|
| 8,364,971 | B2 | 1/2013 | Bell et al. |
| 8,594,374 | B1 | 11/2013 | Bozarth |

(Continued)

FOREIGN PATENT DOCUMENTS

WO         03002387 A1     1/2003

OTHER PUBLICATIONS

Tsai, et al., "Security Management of Authentication System Based on Dynamic Biometric Features", In Proceedings of International Conference on Trustworthy Systems and their Applications, Jun. 9, 2014, pp. 63-68.

(Continued)

*Primary Examiner* — Dant B Shaifer Harriman

(57) ABSTRACT

An electronic device and a method for improving iris recognition for providing access to the electronic device. The electronic device includes an iris scanner, an ambient light sensor, a memory and a processor. The memory includes computer program code for providing access control to the electronic device to a user by iris recognition of the user's iris. The processor causes the electronic device to prompt the user to provide iris samples of the user's iris to the iris scanner in a particular lighting condition measured by the ambient light sensor in occurrence of at least one of first event and second event. The first event occurs if the processor determines a missing information associated with an iris sample in the particular lighting condition in the electronic device. The second event occurs if the processor detects an unsuccessful iris recognition attempt for accessing the electronic device in the particular lighting condition.

20 Claims, 8 Drawing Sheets

(51) Int. Cl.
*G11C 7/00* (2006.01)
*G06F 21/32* (2013.01)
*G06K 9/00* (2006.01)
*H04N 5/33* (2006.01)
*H04N 5/232* (2006.01)
*H04N 5/235* (2006.01)
*H04N 5/225* (2006.01)
*H04W 12/06* (2009.01)

(56) References Cited

U.S. PATENT DOCUMENTS

| | | | |
|---|---|---|---|
| 9,264,412 B1* | 2/2016 | Chao | H04L 63/08 |
| 9,781,119 B2* | 10/2017 | Matus | H04L 63/101 |
| 2006/0282671 A1* | 12/2006 | Burton | G06F 21/32 713/176 |
| 2007/0147811 A1* | 6/2007 | Nakao | A61B 3/113 396/18 |
| 2009/0207251 A1 | 8/2009 | Kobayashi et al. | |
| 2013/0063582 A1* | 3/2013 | Choi | G06K 9/00617 348/78 |
| 2013/0194407 A1* | 8/2013 | Kim | G06K 9/00617 348/78 |
| 2013/0223696 A1 | 8/2013 | Azar et al. | |
| 2014/0118520 A1* | 5/2014 | Slaby | G06K 9/00926 348/77 |
| 2014/0196143 A1* | 7/2014 | Fliderman | G06F 21/32 726/19 |
| 2015/0020191 A1 | 1/2015 | Vida et al. | |
| 2015/0256738 A1* | 9/2015 | Inoue | G02B 7/34 348/362 |
| 2015/0301595 A1* | 10/2015 | Miki | A61B 3/113 715/847 |

OTHER PUBLICATIONS

Chen, et al., "Sensor-Assisted Facial Recognition: An Enhanced Biometric Authentication System for Smartphones", In Proceedings of the 12th annual international conference on Mobile systems, applications, and services, Jun. 2, 2014, 14 pages.

Lowe, Mike, "Watch as Fujitsu Iris Recognition Tech Unlocks Smartphone at a Glance, Literally (Video)", Published on: Mar. 5, 2015 Available at: http://www.pocket-lint.com/news/133054-watch-as-fujitsu-iris-recognition-tech-unlocks-smartphone-at-a-glance-literally-video.

Phang, Shiau Shing, "Investigating and developing a Model for Iris Changes under Varied Lightening Conditions", In Master Thesis, Aug. 5, 2015, 212 pages.

Halbritter, et al., "Bio-Sensing Iris Scan Security for Smartphones and Mobile Devices", Published on: Jul. 24, 2015 Available at: http://www.sensorsmag.com/bio-sensing/iris-scan-security-smartphones-and-mobile-devices-18777.

Tsai, Yao-Hong, "A Weighted Approach to Unconstrained Iris Recognition", In International Journal of Computer, Electrical, Automation, Control and Information Engineering vol. 8, Issue 1, Aug. 5, 2015, pp. 31-33.

Garg, et al., "Feature Selection Method for Iris Recognition Authentication System", In Global Journal of Computer Science and Technology Graphics & Vision, vol. 12, Issue 10, Jun. 2012, 5 pages.

Park, et al., "A Study on Iris Localization and Recognition on Mobile Phones", In EURASIP Journal on Advances in Signal Processing, vol. 2008, Issue 1, Jan. 1, 2008, 13 Pages.

"International Search Report and Written Opinion Issued in PCT Patent Application No. PCT/US2016/055380", dated Dec. 20, 2016, 11 Pages.

"International Preliminary Report on Patentability Issued in PCT Application No. PCT/US2016/055380", dated Aug. 25, 2017, 7 Pages.

* cited by examiner

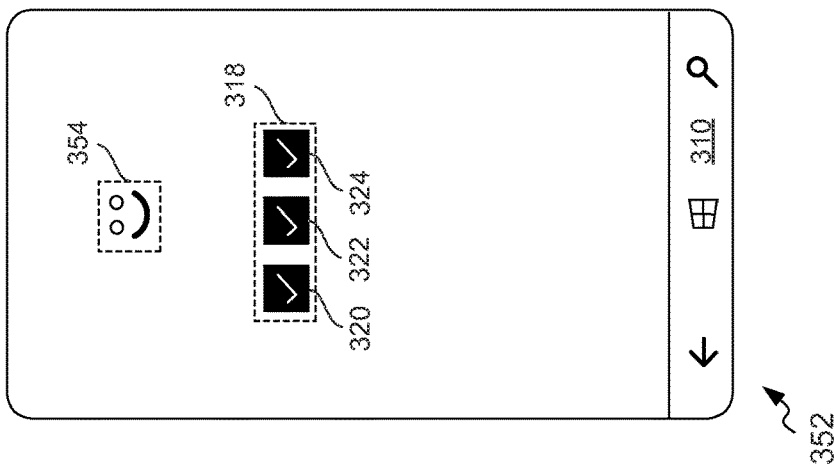
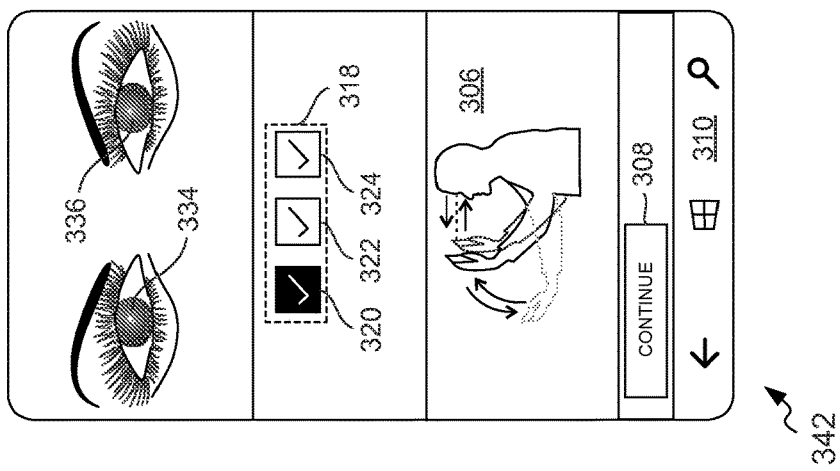
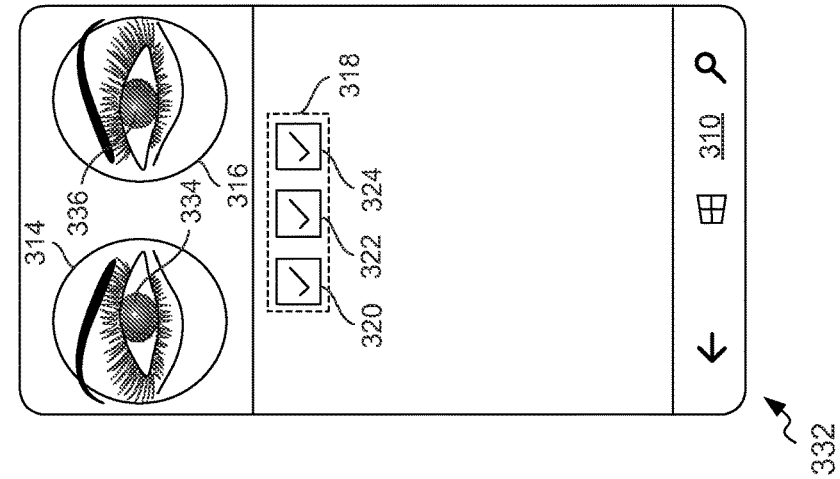

ELECTRONIC DEVICES WITH IMPROVED IRIS RECOGNITION AND METHODS THEREOF

TECHNICAL FIELD

The present application generally relates to biometric authentication for electronic security, and more particularly to iris recognition for providing access to electronic devices.

BACKGROUND

Electronic devices including mobile phones, personal digital assistants (PDAs), tablets, notebook, smart watches, and the like have become integral part of human life, and these devices need protection from unauthorized access, as their users often keep sensitive information or carry out sensitive activities on these devices. From among many prevalent techniques of user authentication, biometric authentication is quite reliable due to the uniqueness of people in majority of the biometric identification techniques. For instance, fingerprint scan, iris or facial recognition have been used for a long time for access control associated with electronic devices. Further, among the biometric authentication techniques, iris recognition is highly reliable and one of the safest technique, as in reality, every individual in the world has an iris with a unique pattern that is different from others. For instance, no two irises of different people are the same, and in fact even an individual's left and right eyes have different iris patterns. Generally, with iris recognition, a false acceptance rate of an iris recognition system is around 1 in 1.2 millions and the false rejection rate is nearly 0 percent which is superior to other biometric authentication techniques.

For the purposes of iris recognition, iris samples (images) of the user are shot by specialized infrared cameras that use light emitting diode (LED) to illuminate the irises of the user. However, in real world, success of iris recognition attempted in a certain lighting condition depends on iris samples registered in that lighting condition. For instance, if the registration of the iris samples has been done in an indoor lighting condition, users may encounter errors if they try to get their irises recognized in daylight which has infrared in light.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, an electronic device with improved iris recognition for providing access to the electronic device is presented. The electronic device includes an iris scanner, an ambient light sensor, a memory and a processor. The iris scanner is for capturing iris samples of a user's iris. The ambient light sensor is for measuring lighting condition in surroundings of the electronic device. The memory includes computer program code for providing access control to at least a part of the electronic device to a user by using at least iris recognition of the user's iris. The processor is communicatively coupled with the memory, the ambient light sensor and the iris scanner. The processor is configured to execute the computer program code to cause the electronic device to prompt the user to provide one or more iris samples of the user's iris to the iris scanner in a particular lighting condition measured by the ambient light sensor in occurrence of at least one of a first event and a second event. The first event occurs if the processor determines at least a missing information associated with an iris sample in the particular lighting condition in the electronic device. The second event occurs if the processor detects an unsuccessful iris recognition attempt for accessing at least the part of the electronic device by the user in the particular lighting condition.

In an embodiment, a method for improving iris recognition for providing access to the electronic device is presented. The method includes detecting an access attempt of a user for accessing at least a part of an electronic device. The method further includes measuring a lighting condition, by an ambient light sensor, in surroundings of the electronic device. Upon detecting an occurrence of at least one of a first event and a second event by a processor in the electronic device, the method includes prompting the user to provide one or more iris samples of user's iris to an iris scanner of the electronic device in a particular lighting condition measured by the ambient light sensor. The first event occurs if the ambient light sensor detects the particular lighting condition in the surroundings of the electronic device, and at least a missing information associated with an iris sample in the particular lighting condition is detected in the electronic device. The second event occurs if an unsuccessful iris recognition attempt of the user is detected in the particular lighting condition for accessing at least the part of the electronic device.

In an embodiment, a computer program product includes at least one computer-readable storage medium. In one embodiment the computer-readable storage medium includes non-transitory computer-readable storage media only and in another embodiment the computer-readable storage medium includes transitory and non-transitory computer-readable storage media. The computer-readable storage medium includes a set of instructions, which, when executed by one or more processors, cause an electronic device to at least perform detection of an access attempt of a user for accessing at least a part of the electronic device. A lighting condition is measured, by an ambient light sensor, in surroundings of the electronic device. Upon detecting an occurrence of at least one of a first event and a second event by a processor in the electronic device, the user is prompted to provide one or more iris samples of user's iris to an iris scanner of the electronic device in a particular ambient lighting condition measured by the ambient light sensor. The first event occurs if the ambient light sensor detects a particular lighting condition in the surroundings of the electronic device, and at least a missing information associated with an iris sample in the particular lighting condition is detected in the electronic device. The second event occurs if an unsuccessful iris recognition attempt of the user is detected in the particular lighting condition for accessing at least the part of the electronic device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein:

FIG. 3A-3E illustrate example representations of interactive displays presented to a user for the improvement of iris recognition, in accordance with an example embodiment;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Various example embodiments of the present disclosure provide improved iris recognition in electronic devices. These example embodiments provide iris recognition for providing access to the electronic devices or to one or more parts of the electronic devices (e.g. to an application in the electronic devices) primarily by creating iris templates (e.g., collections of iris samples) of one or more users (e.g., authorized users) of the electronic devices, where the iris templates are created for a plurality of lighting conditions. In some example embodiments, during use cases, an electronic device is capable of detecting those lighting conditions in the surroundings of the electronic device for which no iris templates are already stored in the electronic devices, and the electronic device is caused to prompt the user to enroll/register one or more iris samples for such lighting conditions. Additionally, some example embodiments offer improvement/modification in existing iris templates (by way of replacing or adding additional iris samples) associated with certain lighting conditions under which the accesses to the electronic device are denied based on unsuccessful iris recognitions of the user's irises. Various example embodiments of improved iris recognition in electronic devices are explained with reference to FIGS. 1 to 7. In so much, for facilitating the description of some example embodiments, certain examples of user interfaces (e.g., interactive displays) and schematic diagrams are used only for example purposes, and as such, these examples should be not be considered as limiting to the scope of the present disclosure.

Herein, the terms 'lighting condition' and 'ambient lighting condition' are interchangeably used and these terms refer to lighting condition in the surroundings of an electronic device. It should be noted that there may be various ambient lighting conditions present in the surroundings of the electronic device and/or generated by a flash illumination, for example, natural day light, artificial light, indoor light, outdoor light, etc. In general, it should be noted that the surroundings of the electronic device may experience a wide variety of lighting conditions, changing based on the time of the day (e.g., early morning, morning, noon, evening, night, etc.), weather (e.g., overcast, sunny, etc.) and the location (e.g., indoors, outdoors, parking areas, back alleys, commercial entrances, office spaces, etc.) where the electronic device is accessed.

Figure 1:
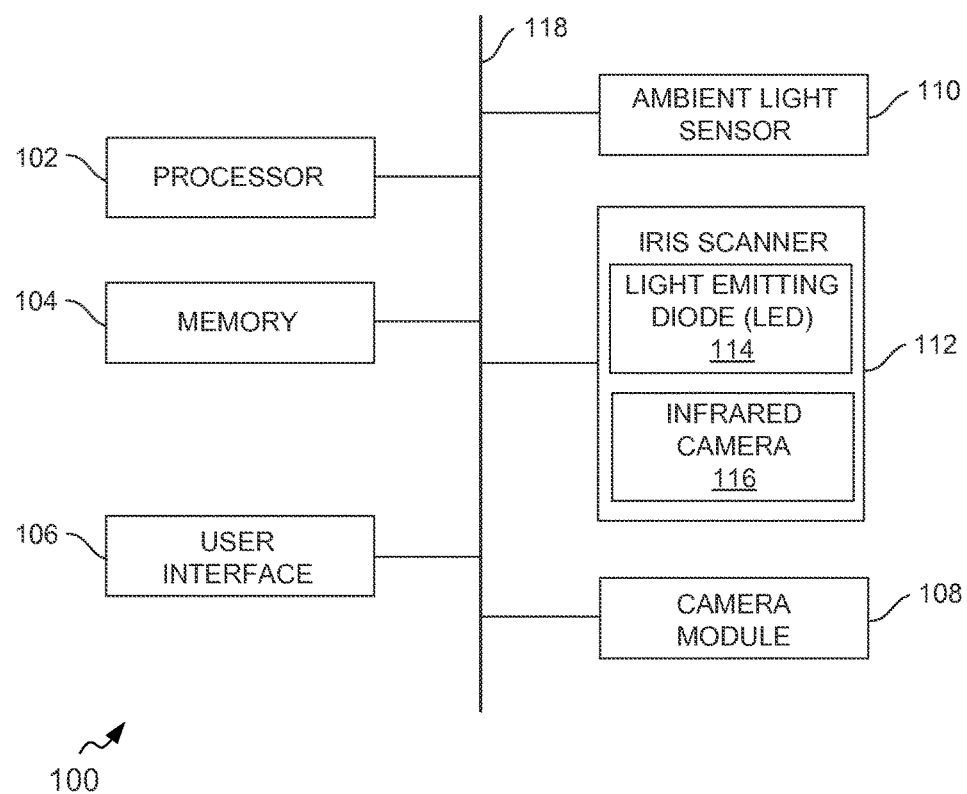
FIG. 1 is a schematic representation of an electronic device with improved iris recognition for providing access to the electronic device.

FIG. 1 is a block diagram showing an electronic device 100, in accordance with an example embodiment. It is understood that the electronic device 100 as illustrated and hereinafter described is merely illustrative of an electronic device that could benefit from embodiments of the disclosure and, therefore, should not be taken to limit the scope of the disclosure. The electronic device 100 may be a mobile phone, a laptop computer, a tablet computer, a media player, a camera, a video recorder, a global positioning system (GPS) apparatus, and/or any other type of electronic system including image capturing and iris recognition capabilities. It is noted that the electronic device 100 may include fewer or more components than those depicted in FIG. 1. Moreover, the electronic device 100 may be implemented as a centralized device, or, alternatively, various components of the electronic device 100 may be deployed in a distributed manner while being operatively coupled to each other. In an embodiment, one or more components of the electronic device 100 may be implemented as a set of software layers on top of existing hardware systems.

In at least one example embodiment, the electronic device 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the electronic device 100 to perform one or more actions, for example, configuring iris templates for authorized users of the electronic device 100, and further improving the iris templates under various ambient lighting conditions.

The memory 104 may be embodied as one or more volatile memory devices, one or more non-volatile memory devices, and/or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In at least one embodiment, the electronic device 100 includes a user interface 106 (also referred to as UI 106) for providing an output and/or receiving an input. The user interface 106 is configured to be in communication with the processor 102 and the memory 104. Examples of the user interface 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal display, active-matrix organic light-emitting diode (AMOLED) display, a microphone, a speaker, ringers, vibrators, and the like. In an example embodiment, the processor 102 may include user interface circuitry configured to control at least some functions of one or more elements of the user interface 106, such as, for example, a speaker, a ringer, a microphone, a display, and/or the like. The processor 102 and/or the user interface circuitry may be configured to control one or more functions of the one or more elements of the user interface 106 through computer program instructions, for example, software and/or firmware, stored in a memory, for example, the memory 104, and/or the like, accessible to the processor 102.

In an example embodiment, the electronic device 100 includes a camera module 108, for example including one or more digital cameras. The camera module 108 is configured to be in communication with the processor 102 and/or other components of the electronic device 100 to capture digital image frames, videos and/or other graphic media. The camera module 108 may include hardware and/or software necessary for creating a digital image frame from a captured image, or facilitating a viewfinder image frame of a scene in front of the camera module 108. For example, the camera module 108 may include hardware, such as a lens and/or other optical component(s) such as one or more image sensors. Examples of one or more image sensors may include, but are not limited to, a complementary metal-oxide semiconductor (CMOS) image sensor, a charge-coupled device (CCD) image sensor, a backside illumination sensor (BSI) and the like. Alternatively, the camera module 108 may include only the hardware for viewing a digital image frame, while a memory device of the electronic device 100 stores instructions for execution by the processor 102 in the form of software for creating a digital image frame from a captured image. In an example embodiment, the camera module 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

In at least one example embodiment, the electronic device 100 includes an ambient light sensor 110. The ambient light sensor (ALS) 110 is configured to detect the amount of light (e.g., ambient light intensity) available in the surroundings of the electronic device 100. The ALS 110 may include photo detectors capable of converting light into voltage or current so that the ambient light can be read by the electronic device 100. For instance, the ALS 100 can include suitable circuitry such as polychromatic color sensor, analog to digital converters and digital signal processor (e.g., separate or embodied in the processor 102) to determine the ambient lighting condition in the surroundings of the electronic device 100. It should be noted that examples of the ALS 110 can be any ambient light sensor that can perceive brightness of the ambient light in a same way as human eyes do.

In at least one example embodiment, the electronic device 100 includes an iris scanner 112. The iris scanner 112 is embodied by way of components (e.g., combination of hardware, software and firmware) configured to apply mathematical pattern-recognition techniques on images of a single or both irises of the user of the electronic device 100. As such, the iris scanner 112 is capable of capturing high quality iris samples of user in form of complex random patterns that are unique, perceivable and stable. In at least one example embodiment, the iris scanner 112 primarily includes at least one infrared light emitting diode, for example, a light emitting diode (LED) 114 and an infrared camera 116. The LED 114 and infrared camera 116 of the iris scanner 112 may be arranged as a single module, or otherwise adjacent each other, or they may be arranged separate from each other and at a distance from each other within the electronic device 100. The LED 114 is configured to illuminate the surrounding region of the one or both irises and the infrared camera 116 is together with the processor 102 configured to generate high quality patterns of the one or both irises. In a non-limiting example, the infrared camera 116 may be a high resolution black and white camera with a field of view (FoV) between a range of 8 degrees to 28 degrees. In an example embodiment, the infrared camera 116 is synchronized with the camera module 108 (a camera installed on the same side of the electronic device 100 where the infrared camera 116 is installed) such that when the user adjusts his eyes in a field of view of the infrared camera 116 with the help of viewfinder image frames generated by the camera module 108 and displayed on the UI 106; and the infrared camera 116 captures one or more iris shots of the user's iris. Herein and throughout the description, unless the context suggests otherwise, the term 'user's iris' represents one or both the irises of the user.

The various components of the electronic device 100, such as components (102-116) may communicate with each other via a centralized circuit system 118 to provide improved iris recognition in the electronic device 100. The centralized circuit system 118 may be various devices configured to, among other things, provide or enable communication between the components (102-116) of the electronic device 100. In certain embodiments, the centralized circuit system 118 may be a central printed circuit board (PCB) such as a motherboard, a main board, a system board, or a logic board. The centralized circuit system 118 may also, or alternatively, include other printed circuit assemblies (PCAs) or communication channel media.

In at least one embodiment, the memory 104 is configured to store computer program code for providing access control to at least a part of the electronic device 100 by using iris recognition. Hereinafter, the 'computer program code for providing access control' is also referred to as 'access control software' throughout the description. Further, access control of 'at least a part of the electronic device' represents either entire access of the electronic device 100, or a partial access of the electronic device 100 for example access of a particular application (native or third party application) available in the electronic device 100. For example, upon a successful iris recognition of the user, a pre-determined access control of the electronic device 100 (e.g., access of a start-up screen, a main menu, or any particular application installed in the electronic device 100) may be provided.

The memory 104 also includes image processing instructions that are executable by the processor 102 for facilitating capture of the iris samples of the user, or for facilitating capture of viewfinder image frames to be displayed on the UI 106. In an example embodiment, the processor 102 is configured to, together with the access control software to provide access control to the electronic device 100 based on successful iris recognition of the user. It should be noted that iris samples of the user are registered with the electronic device 100, for example, stored in a memory location, for example, the memory 104 in the electronic device 100.

In various example embodiments, the processor 102 is configured to, together with the access control software, prompt the user for providing one or more iris samples in a particular lighting condition measured by the ALS 110 in occurrence of at least one of a first event or a second event.

An example of the 'first event' includes a situation when the processor 102 determines at least 'a missing information associated with an iris sample' in a particular lighting condition (e.g., L1) measured by the ALS 110 in the electronic device 100. For instance, the first event may be construed to occur when the ALS 110 measures a current ambient lighting condition in the surroundings of the electronic device 100 as the particular lighting condition (L1); and the processor 102, by accessing existing iris template present in the electronic device 100, determines that an iris sample ($I_{L1}$) in the lighting condition (L1) is not present in the electronic device 100. It is noted that the iris sample ($I_{L1}$) in the lighting condition (L1) may not be present in the electronic device 100, if the iris sample ($I_{L1}$) is never captured or recorded in the electronic device 100, or in some example may be corrupted after its storage. In an example embodiment, 'missing information associated with the iris sample' in the lighting condition L1 represent that the iris sample ($I_{L1}$) in the lighting condition (L1) is not recorded in the electronic device 100 by the user. Additionally, in another example embodiment, 'missing information associated with the iris sample' in the lighting condition (L1) represent that iris sample in the lighting condition (L1) is present, but is not proper in terms of quality.

An example of the 'second event' includes a situation when the processor 102 detects an unsuccessful iris recognition attempt of the user for accessing the electronic device 100. In an example, the second event may be construed to occur when the user attempts to access the electronic device 100 in the particular lighting condition (e.g., L1) as measured by the ALS 110, and an iris sample captured by the iris scanner 112 in lighting condition (L1) does not match with the already registered (or enrolled/stored) iris samples in the electronic device 100 for the lighting condition (L1), and hence the access to the electronic device 100 is denied to the user. For example, if the iris sample captured by the iris scanner 112 in the lighting condition (L1) is denoted as '$S_{L1}$' and the iris sample associated with the lighting condition (L1) already stored in the electronic device 100 is denoted as '$I_{L1}$'; and the Su does not match with the $I_{L1}$; the access to the electronic device 100 is denied and such a scenario is construed as the occurrence of the second event. Accordingly, whenever an unsuccessful iris recognition attempt occurs in accessing the electronic device 100 in a particular lighting condition (e.g., L1) as measured by the ALS 110, the processor 102 is configured to prompt the user to provide iris samples in the particular lighting condition (e.g., L1) in order to improve already stored iris samples for the particular lighting condition (e.g., L1) so that the electronic device 100 is better equipped to provide iris recognition in the particular lighting condition (e.g., L1) in future use cases. In an example embodiment, the processor 102 is configured to detect a mismatch between the $S_{L1}$ and the $I_{L1}$ when there is at least a pre-defined degree of mismatch (e.g., 45%) between the $S_{L1}$ and the $I_{L1}$.

Figure 2:
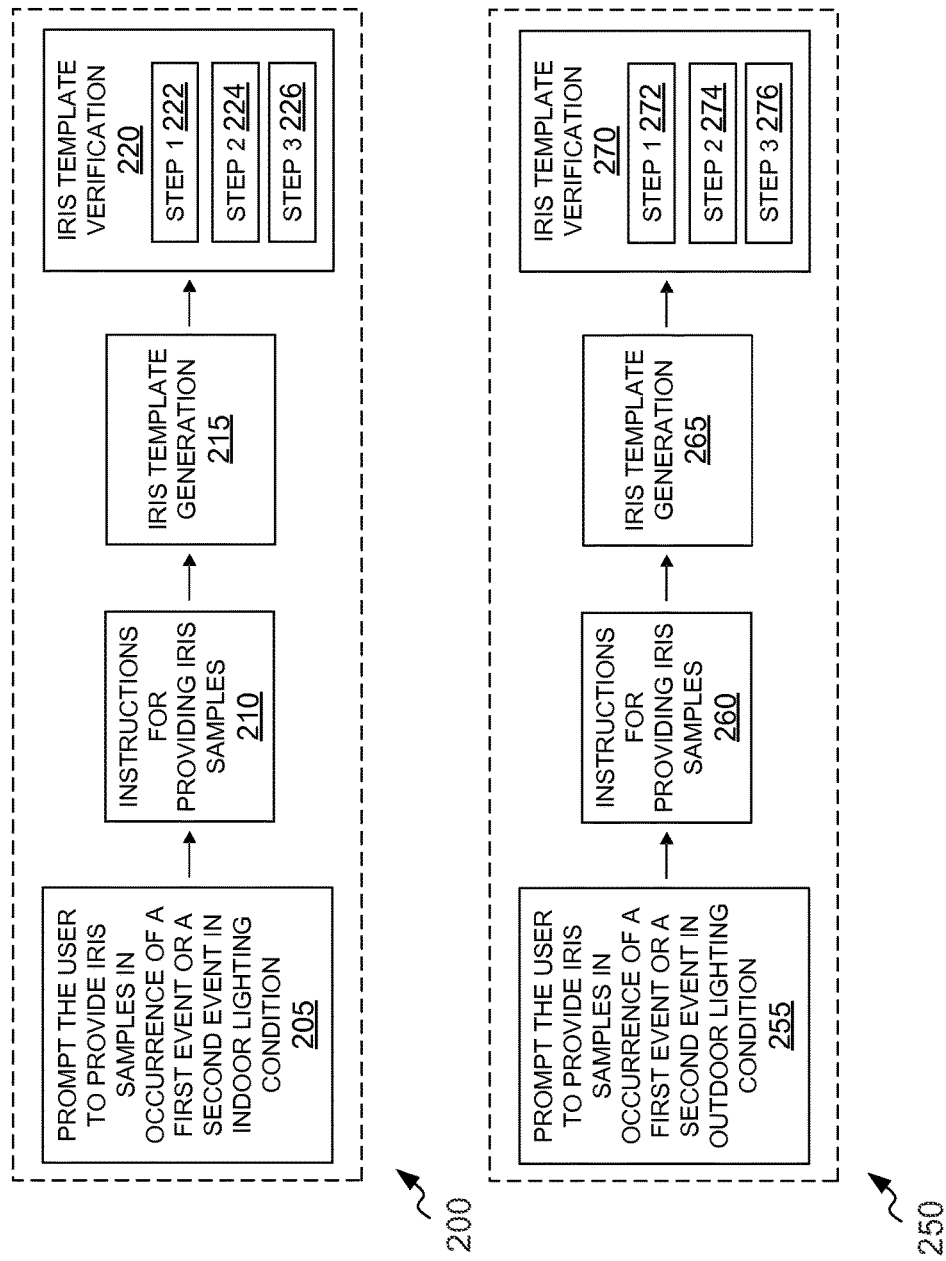
FIG. 2 shows schematic diagrams for illustrating example representation of a process flow for the improvement of iris recognition for providing access to the electronic device, in accordance with an example embodiment.

FIG. 2 illustrates process flow diagrams of generation of an iris template in one or more lighting conditions measured by the ALS 110 in the electronic device 100, in accordance with an example embodiment. For the clarity of the description, it may be noted that the iris template may include iris sub-templates for individual lighting conditions. For instance, an iris sub-template is associated with a given lighting condition, and the iris sub-template for the given lighting condition may include one or more iris samples (collection of iris shots) captured in the given lighting condition. Accordingly, the iris template for the electronic device 100 may be considered as a global iris template that includes a plurality of iris sub-templates for a plurality of lighting conditions generally encountered while using the electronic device 100 or chosen as pre-defined lighting conditions. Herein, phrases such as 'an iris template associated with a lighting condition' or 'an iris template in a lighting condition' are used throughout the description, and such phrases only denote 'an iris sub-template that is generated in the lighting condition', unless the context suggests otherwise.

In an example embodiment, when the electronic device 100 is used for the first time, as part of generation process of an iris template, iris sub-templates are generated in various lighting conditions as prompted by the electronic device 100. In an example embodiment, the various lighting conditions may be suggested by the electronic device 100, such that there are lighting differences between the various lighting conditions, as the generated iris template should be rich, robust and it should include patterns for different lighting conditions generally encountered while using the electronic device 100. Some non-exhaustive examples of the lighting conditions may include an indoor lighting condition and an outdoor lighting condition. For instance, in an example, the electronic device 100 may prompt the user to provide one or more iris samples in each of the indoor lighting condition and in the outdoor lighting condition.

As shown in FIG. 2, a process flow 200 illustrates generation of the iris template in a lighting condition, for example, an indoor lighting condition (Lin). In operation 205, the electronic device 100 is started, or any third party application that requires iris recognition for its access is opened. The ALS 110 measures the current lighting condition, for example, the indoor lighting condition (of a predetermined range of brightness). In some examples, during a set up process, when the electronic device 100 is operated for the first time, the user may be prompted by the electronic device 100 to be present with the electronic device 100 in the indoor lighting condition (Lin).

In an example embodiment, the operation 205 is triggered when the processor 102 detects occurrence of at least one of the first event or the second event. As described with reference to FIG. 1, the first event occurs when there is no iris sample stored in the electronic device 100 for a particular lighting condition (e.g., Lin) measured by the ALS 110. For example, when it is considered that one or more iris samples in Lin are not present (i.e., missing information for the one or more iris samples in Lin is detected in the electronic device 100) in the electronic device 100, the operation 205 of the process of generation of the iris template in the indoor lighting condition (Lin) is triggered. Similarly, the second event occurs when access to the electronic device 100 is denied based on the iris recognition of the user in the particular lighting condition (e.g., Lin)

measured by the ALS 110. For instance, even if the iris template associated with the indoor lighting condition (Lin) is already stored in the electronic device 100, but an unsuccessful iris recognition attempt of the user (e.g., access of the electronic device 100 is denied) is detected in the indoor lighting condition (Lin), the operation 205 of process of generation of the iris template in the indoor lighting condition (Lin) is triggered. In such a scenario of occurrence of the second event, generation of the iris template includes improving or modifying the existing iris template in the electronic device 100. Herein, in an example, improving or modifying the existing iris template includes populating the existing iris template with increased number of iris samples, or may also include replacing some of the poorly recorded iris samples with fresh iris samples in order to increase a rate of successful iris recognition in future applications.

In operation 210, the processor 102 together with the access control software, causes the electronic device 100 to display instructions on the UI 106 that can be followed by the user to provide iris samples in the indoor lighting condition (Lin). For instance, an animated video, or a text may be displayed so as to educate the user about steps to be followed for providing the iris samples. In an example, the instructions may be displayed for the user to record the iris samples without wearing glasses. Additionally, the instructions may also be displayed for the user to record the iris samples when the user's eyes are open wide.

In operation 215, iris template is generated for the indoor lighting condition (Lin). For instance, one or more iris samples are stored in form of the iris template associated with the indoor lighting condition (Lin) in the memory 105 or in any other suitable memory location present in the electronic device 100, or otherwise easily accessible to the electronic device 100.

Further, in operation 220, the processor 102 causes the iris scanner 112 to capture a plurality of clean up shots, for example, for verifying the iris samples in the iris template. In an example, more than 30 shots of the user's iris may be taken in one step of verification. There may be more than one verification steps, for example, as shown by 222, 224 and 226. In an example embodiment, the clean up shots may not be taken in one go. Additionally or alternatively, the clean up shoots may be collected over a period of time taken from each unlock of the electronic device 100 based on the iris recognition of the user's iris.

Further, as shown in FIG. 2, a process flow 250 illustrates generation of the iris template in a lighting condition, for example, an outdoor lighting condition (Lout). The process flow 250 is similar to the process flow 200, with the indoor lighting condition (Lin) replaced by the outdoor lighting condition (Lout). For instance, in operation 255, the electronic device 100 is started or any third party application that requires iris recognition for access is opened, and the occurrence of the first event or the second event is detected. In some examples, during a set up process when the electronic device 100 is operated for the first time, the user may be asked to be present with the electronic device 100 in the outdoor lighting condition (Lout). In operation 260, the processor 102 together with the access control software, causes the electronic device 100 to display instructions on the UI 106 that can be followed by the user for providing iris samples in the outdoor lighting condition (Lout).

In operation 265, iris template is generated for the outdoor lighting condition (Lout). For instance, one or more iris samples are stored in form of the iris template associated with the outdoor lighting condition (Lout). Further, in operation 270, the processor 102 causes the electronic device 100 to capture a plurality of clean up shots, for example, for verifying the iris samples in the iris template associated with the outdoor lighting condition (Lout). In an example, more than 30 shots of the user's iris may be taken in one step of verification, and there may be more than one verification steps, for example, shown by 272, 274 and 276.

In various example embodiments, when the user accesses the electronic device 100 for the first time in a given lighting condition (Li, where i can vary from 1 to n, n can be any integral number) measured by the ALS 110, the processor 102 is configured to prompt the user to provide iris samples for registering the iris samples in the lighting condition (Li). It should be noted that the iris samples in a variety of lighting conditions may be stored in form of corresponding iris sub-templates in the iris template. For instance, an iris sub-template for the lighting condition (Li) may include a plurality of iris samples of the user's iris that are captured where the ALS 110 measures the lighting condition (Li) in the surroundings of the electronic device 100.

An example embodiment of registration of iris samples in occurrence of the first event (e.g., a scenario where at least one iris sample in the lighting condition (Li) measured by the ALS 110 is already not present in the electronic device 100) are herein explained with example representations of interactive displays presented to the user as shown in FIGS. 3A-3E. It should be noted that interactive displays shown in FIGS. 3A-3E are only for the ease of description of the example embodiments, and should not be considered limiting to the scope of the present disclosure. It should be noted that interactive displays on the UI 106 can be configured in a variety of ways based on the access control software along with hardware components of the electronic device 100.

Figure 3B:
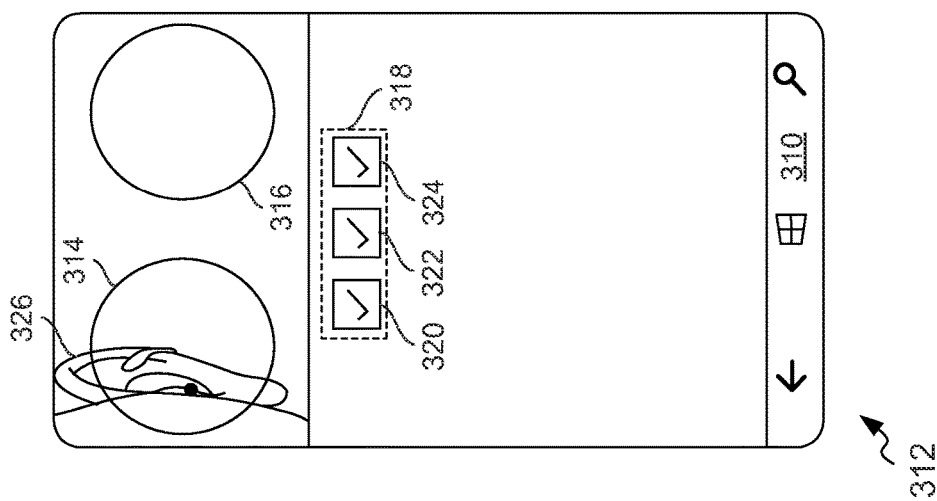
Figure 3A:
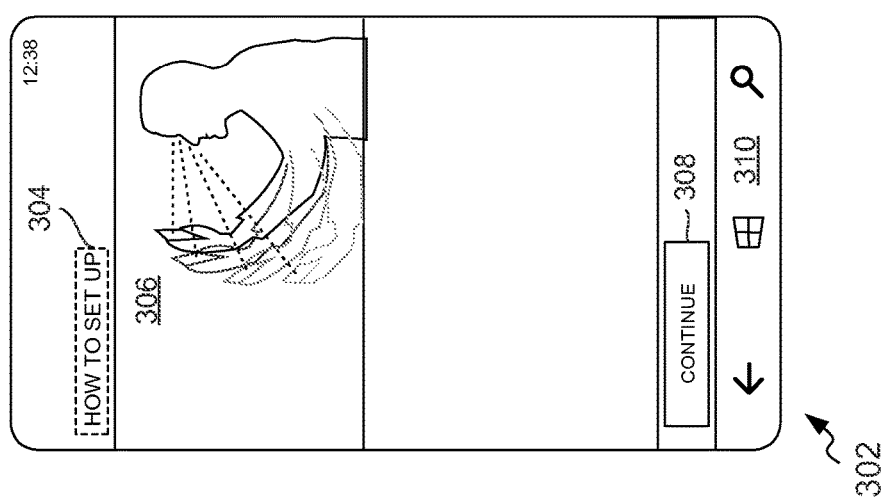

FIG. 3A is a schematic diagram illustrating an example representation of an interactive display 302 presented to a user, in accordance with an example embodiment. In at least one example embodiment, the processor 102 causes the electronic device 100 to present the interactive display 302 to the user in occurrence of at least one example of the first event. For instance, consider a scenario where the user attempts to access the electronic device 100 and the ALS 110 measures a particular lighting condition (Li) in the surroundings the electronic device 100, and the processor 102 determines that the iris samples in the particular lighting condition (Li) are not present in the electronic device 100. In such scenario, the interactive display 302 is presented to the user to initiate a registration process of one or more iris samples in the particular lighting condition (Li) measured by the ALS 110.

As shown in the interactive display 302 (e.g., a touch screen display), a section 304 represents 'how to set up' message, an interactive section 306 represents graphical representation of ways to provide iris samples, and a continue label 308 represents a selectable option for selecting to continue with the iris sample collection process, and a section 310 represents pre-defined menu labels (e.g., labels for 'back window', 'home page' and 'search page'). It is understood that the display 302 may not be a first display screen presented to the user upon the processor 102 determining the missing information of iris sample in the lighting condition (Li). The display 302 is only provided for example purposes and only for facilitating description of an example embodiment of the present disclosure. In fact, the access control software may be configured to prompt the user for providing the iris samples in the lighting condition (Li) in a variety of other ways. In an example embodiment, the interactive section 306 may include an animated graphical representation of instructions that the user can follow for providing the iris samples. For instance, the interactive section 306 may display a short video clip showing a process which should be followed by the user to provide the iris samples. It is noted that the primary objective of providing the interactive section 306 is to guide the user to scan the user's one or both irises in one or more suitable ways that can be presented on the UI 106.

FIG. 3B is a diagram illustrating an example representation of an interactive display 312 presented to a user, in accordance with an example embodiment. In an example, the display 312 may be presented following the display 302 as shown in FIG. 3A. It is understood that the display 312 may not be an immediate succeeding display of the display 302, and there may be one or more intermediate interactive displays configured between the displays 302 and 312 depending upon configuration of the access control software and its execution by the processor 102.

As shown in display 312, the user is prompted to adjust the eyes within circle guides 314 and 316 so as to facilitate capture of iris samples. For instance, the circle guide 314 can be intended to guide the left eye of the user and the circle 316 may be intended to guide the right eye of the user. In an example embodiment, the circle guides are displayed depending upon the field of view of the infrared camera 116. It is noted that instead of circle guides 314 and 316, guides may be of other shapes as well for example, of shape of eyes or of rectangular shape. In an example embodiment, a view finder image frame of the user can be generated by the camera module 108, and the view finder image frame displayed on the UI 106 assists the user to set his/her eyes according to the circle guides 314 and 316. For instance, the user adjusts position of the eyes such that the eyes displayed in the viewfinder image frame lie inside the circle guides 314 and 316. In an example embodiment, the user may adjust only one of the eyes (either left or right eye) if the iris samples are to be generated for only one iris instead of both irises. It is understood that the camera module 108 and the iris scanner 112 are synchronized such that as the eyes are adjusted as per the circle guides 314 and 316, the iris scanner 112 captures the iris samples. As shown in the display 312, a portion of an ear 326 of the user overlaps with the circle guide 314 instead of eyes, and hence the iris samples are not captured.

In at least one example embodiment, for the particular lighting condition (Li), more than one iris samples are recorded in the electronic device 100. As shown in the display 312, a region 318 displays iris sampling status (e.g., labels 320, 322 and 324). If a first iris sample is successfully taken by the electronic device 100, the label 320 is highlighted, similarly, when a second iris sample is successfully taken by the electronic device 100, the label 322 is highlighted, and so on an so forth. It is understood that the user may be prompted to provide more or fewer than three iris samples as shown by way of the labels 320, 322 and 324 in the example representation of the display 312.

FIG. 3C is a diagram illustrating an example representation of an interactive display 332 presented to a user, in accordance with an example embodiment. As shown in the display 332, a displayed image of the left iris 334 is adjusted inside the circle guide 314 and a displayed image of the right iris 336 is adjusted inside the circle guide 316. Hence, a first iris sample is taken by the iris scanner 112 which is shown in FIG. 3D.

As shown in an interactive display 342 in FIG. 3D, at least one iris sample is successfully taken as the label 320 is highlighted. Herein, in an example embodiment, the taking one iris sample includes capturing a plurality of iris shots, for example, 30 shots may be captured in one iris sample by the iris scanner 112. It is noted that if an iris sample in the particular lighting condition (Li) includes higher number of iris shots, it provides a rich collections of iris patterns as stored in the electronic device 100 that aids in successful iris recognition while using the electronic device 100.

Further, as per the configuration of the access control software, the processor 102 causes the electronic device 100 to prompt the user for providing next iris sample in the same lighting condition (Li) using the same process of adjusting the eyes as per the circle guides 334 and 336. Accordingly, the user selects the continue label 308, and the next iris sample is recorded, in which multiple iris shots (e.g., 30 iris shots) are captured. As shown in a display 352 in FIG. 3E, the registration of the iris samples for the particular lighting condition (Li) is completed. For instance, all of the labels 320, 322 and 324 are highlighted, and a pictorial completion label (see, 354) is also displayed.

Various example embodiments of the present disclosure provide mechanism for prompting the user of the electronic device 100 to provide iris sample in a particular lighting condition (Li), upon occurrence of the second event (e.g., when the access to the electronic device 100 is denied based on iris recognition). It is noted that the access to the electronic device 100 may be denied when there is at least a pre-defined degree of mismatch between a currently captured iris sample for iris recognition and the registered iris sample associated with the lighting condition (Li). For instance, if the pre-defined degree of mismatch is assumed to be 40%, and there is a 45% mismatch between the currently captured iris sample of the user in the lighting condition (Li) and one or more iris samples stored in an existing iris template associated with the lighting condition (Li), the processor 102 detects that there is a need for improvement in the existing iris template for the lighting condition (Li).

In an example embodiment, upon detection of the unsuccessful iris recognition attempt in accessing the electronic device 100 under the lighting condition (Li), the processor 102 prompts the user to provide one or more iris samples in the lighting condition (Li). It is noted that before storing the newly provided iris samples by the user, the processor 102 is configured to verify the authenticity of the user by prompting the user to provide alternate authentication inputs. Examples of the alternate authentication methods may include, but are not limited to, face detection, finger print detection, and password based detection, PIN input, or pattern input based detection. In another example embodiment, upon detection of the unsuccessful iris recognition attempt in the lighting condition (Li), the processor 102 first prompts for alternate authentication input of the user; and only after the user provide the correct alternate authentication input, the processor 102 prompts the user to provide one or more iris samples in the lighting condition (Li). One such embodiment is herein explained with example representations of interactive displays presented to the user as shown in FIGS. 4A-4C.

Figure 4A:
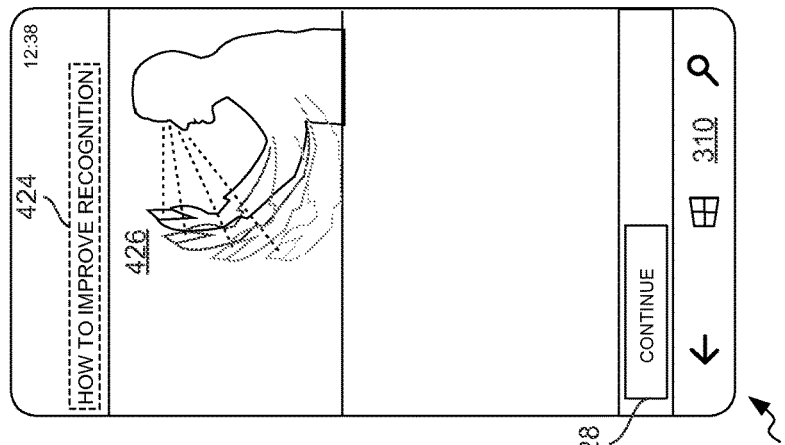
FIG. 4A-4C illustrate example representations of interactive displays presented to a user for the improvement of iris recognition, in accordance with another example embodiment.

FIG. 4A is a diagram illustrating an example representation of an interactive display 402 presented to a user, in accordance with an example embodiment. The interactive display 402 is presented to the user, when the processor 102 detects the unsuccessful iris recognition attempt of the user under the particular lighting condition (Li) measured by the ALS 110. The interactive display 402 includes a label 404 indicating "enter your PIN", a section 406 including selectable numbers for inputting the PIN, a label 408 indicating "emergency call", and the section 310 representing pre-defined menu labels. Once the user inputs the correct PIN as set in the electronic device 100, the authentication of the user is completed.

Figure 4B:
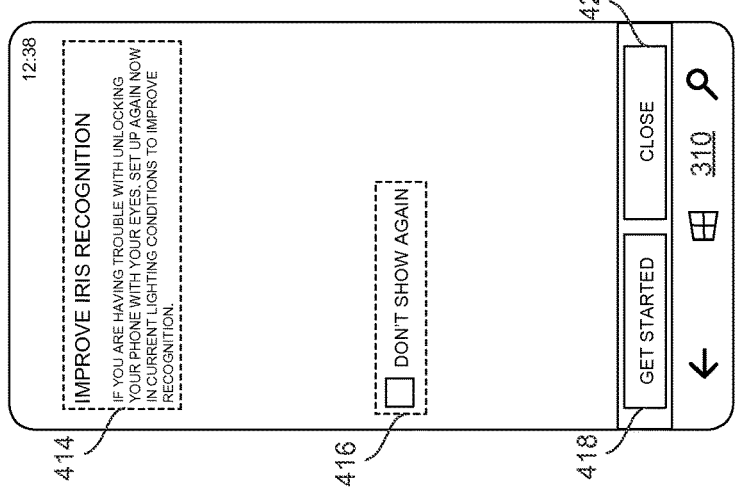

FIG. 4B is a diagram illustrating an example representation of an interactive display 412 presented to a user, in accordance with an example embodiment. In an example embodiment, the interactive display 412 is presented following the successful alternate authentication of the user, for example, by providing the correct PIN as described with reference to FIG. 4A. The interactive display 412 includes a section 414 indicating display message for the user, a section 416 including selectable option for "do not show again" the interactive display 412, a menu label 418 for selecting 'get started', and a menu label 420 for selecting 'close'. In this example representation, the section 414 displays a prompt including an example message for example, "Improve Iris Recognition. If you are having trouble with unlocking your phone with your eyes, set up again now in current lighting conditions to improve recognition". If the user selects the menu label 418, improvement of the iris samples in the lighting condition (Li) starts.

Figure 4C:
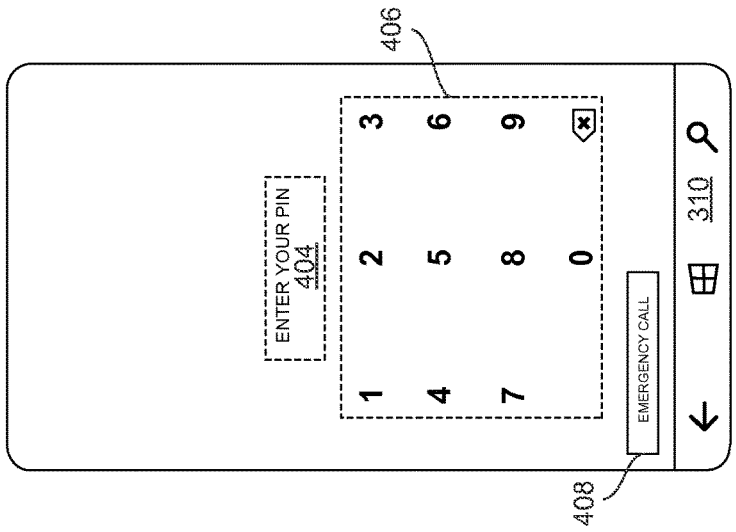

FIG. 4C is a diagram illustrating an example representation of an interactive display 422 presented to a user, in accordance with an example embodiment. As shown in display 422, a section 424 represents 'how to improve recognition' message, an interactive section 426 represents graphical representation of a guide to provide iris samples, and a continue label 428 represents a selectable option for selecting to continue with the iris sample collection process, and the section 310 represents the pre-defined menu labels. The display 422 is only provided for example purposes and only for facilitating description of an example embodiment of the present disclosure. In fact, the access control software may be configured to prompt the user for providing the iris samples in the lighting condition (Li) in a variety of other ways. In an example embodiment, the interactive section 426 may include an animated graphical representation of instructions that can be followed by the user for providing the iris samples. For instance, the interactive section 426 may display a short video clip showing a process which should be followed by the user to provide the iris samples.

Once the user selects the continue label 428, the user may be presented with interactive displays displayed with references to FIGS. 3B to 3E, so that the user can provide the iris samples for improving the iris template for the particular lighting condition (Li).

Figure 5:
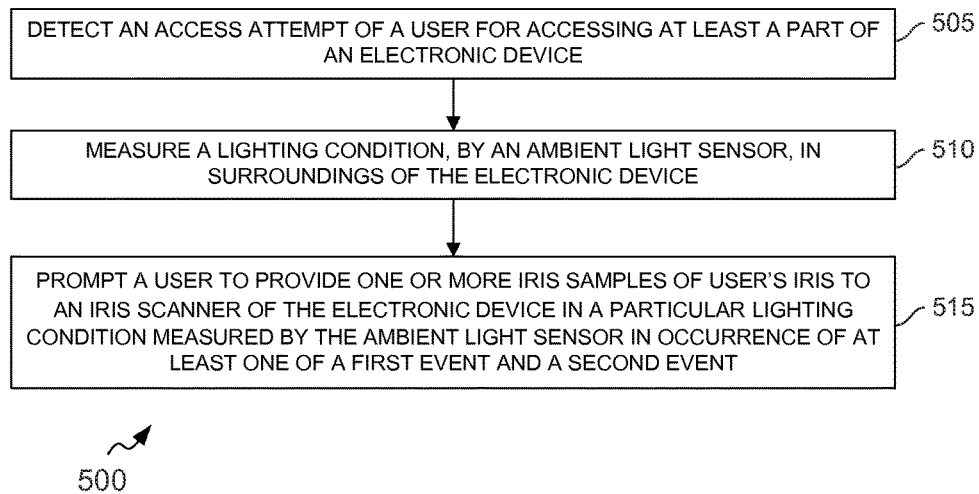
FIG. 5 illustrates an example flow diagram of a method for improving iris recognition for providing access to the electronic device, in accordance with an example embodiment.

FIG. 5 illustrates a flow diagram of a method 500 of iris recognition in an electronic device, such as the electronic device 100. Operations of the method 500 may be performed by, among other examples, by the electronic device 100 of FIG. 1.

At 505, the method 500 includes detecting an access attempt of a user for accessing at least a part of the electronic device. In an example, it may be detected that the user has pressed a power button of the electronic device for accessing the electronic device. In another example, it may be detected that the user has clicked on an application for accessing the application that requires at least an iris recognition of the user for its access.

At 510, the method 500 includes measuring a lighting condition, by an ambient light sensor (e.g., the ALS 110), in the surroundings of the electronic device.

At 515, upon detecting the occurrence of at least one of a first event or a second event, the method 500 includes prompting the user to provide one or more iris samples of the user's iris to the iris scanner in a particular lighting condition measured by the ambient light sensor. The examples of the first event and the second event are explained with references to FIGS. 2, 3A-3E and 4A-4C.

Figure 6:
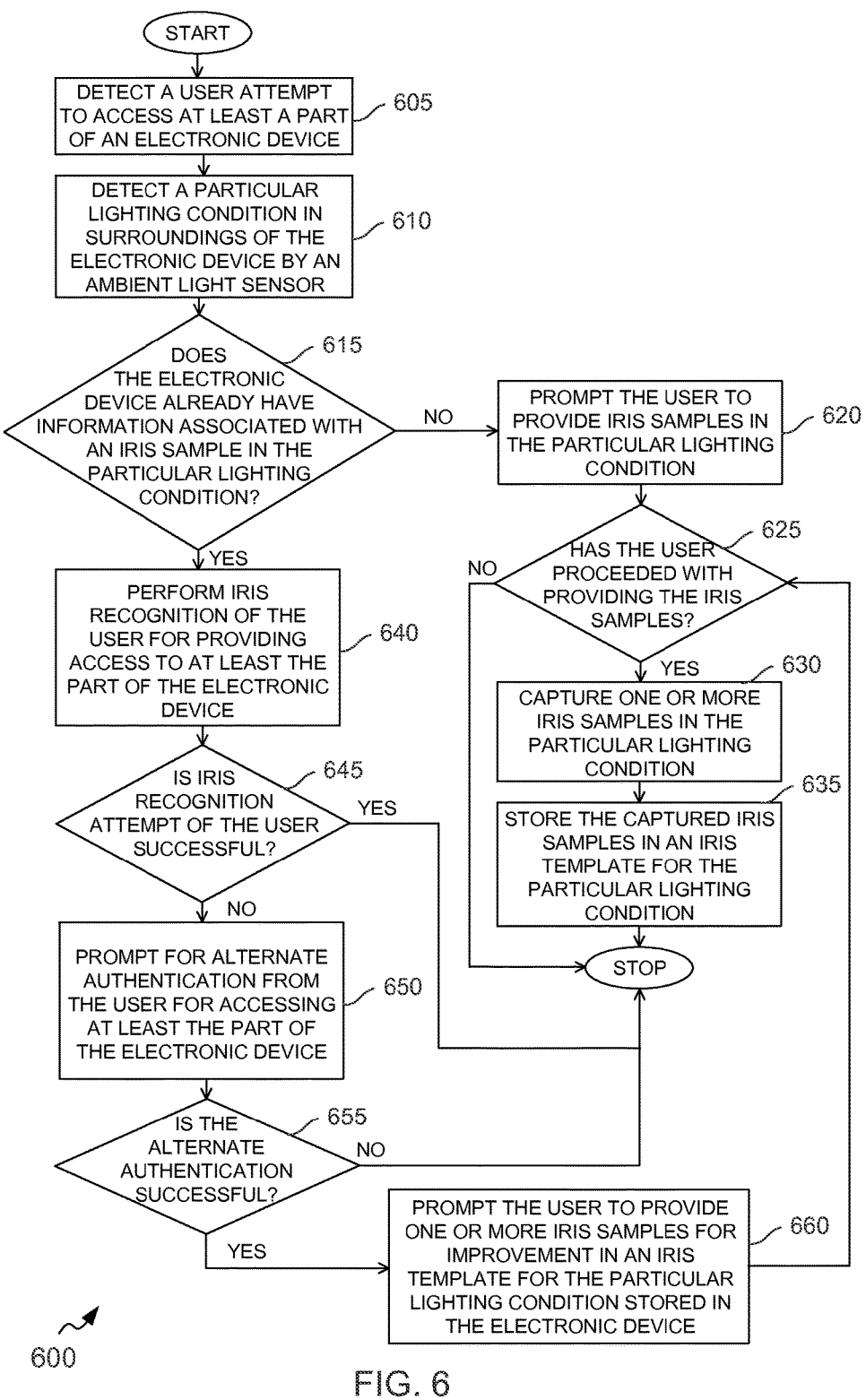
FIG. 6 illustrates an example flow diagram of a method for improving iris recognition for providing access to the electronic device, in accordance with another example embodiment.

FIG. 6 illustrates a flow diagram of a method 600 of iris recognition in an electronic device, such as the electronic device 100, in accordance with an example embodiment of the present disclosure. It should be noted that to facilitate discussions of the flowcharts of FIG. 6, certain operations are described herein as constituting distinct steps performed in a certain order. Such implementations are examples only and non-limiting in scope. Certain operations may be grouped together and performed in a single operation, and certain operations may be performed in an order that differs from the order employed in the examples set forth herein. Moreover, certain operations of the method 600 are performed in an automated fashion. These operations involve substantially no interaction with the user. Other operations of the method 600 may be performed by in a manual fashion or semi-automatic fashion. These operations involve interaction with the user via one or more user interface presentations.

At 605, the method 600 includes detecting a user attempt to access at least a part of the electronic device 100. For instance, when the user powers ON the electronic device 100, or the user switches the electronic device 100 from a standby mode to an active mode, or the user tries to open a third party application on which access is set as through the iris recognition, the processor 102 detects the user attempt to access the electronic device 100.

At 610, the method 600 includes detecting a particular lighting condition (e.g., Li) by an ambient light sensor, for example the ALS 110. At 615, the method 600 detects whether the electronic device 100 has the information associated with an iris sample in the particular lighting condition (Li).

In an example embodiment, when it is detected that the iris sample in the lighting condition (Li) is not present (e.g., missing information is detected for the iris sample in the lighting condition (Li)) in the electronic device 100, the method 600 proceeds to 620. At 620, the method 600 includes prompting the user to provide one or more iris samples in the lighting condition (Li). Examples of prompting the user to provide the one or more iris samples are described with references to FIG. 3A. At 625, it is further checked whether the user proceeds with providing the one or more iris samples upon being prompted at operation 620. If the user proceeds with providing the one or more iris samples in the lighting condition (Li), the method 600 proceeds to operation 630. For instance, as shown in the interactive display 302, if the user selects the continue label 308, the processor 202 determines that the user is willing to provide iris samples in the lighting condition (Li).

Further, at 630, the method 600 includes capturing one or more iris samples in the lighting condition (Li). For instance, the iris scanner 112 captures three iris samples, where each iris sample include a plurality of iris shots as described with reference to FIGS. 3B to 3E. Thereafter, at 635, the method 600 includes storing the captured iris samples in form of an iris template for the lighting condition (Li), and the method 600 terminates.

In an example embodiment, when it is detected that at least one iris sample in the lighting condition (Li) is present (e.g., no missing information is detected for an iris sample in the lighting condition (Li)) in the electronic device 100, the method 600 proceeds to 640. At 640, the method 600 includes performing iris recognition of the user for providing access to at least the part of the electronic device 100. In an example, performing iris recognition includes capturing at least one iris shot and matching the capturing iris shot with iris samples in the lighting condition (Li) that are stored in the electronic device 100. At 645, it is checked whether the iris recognition attempt of the user is successful. For instance, if the iris recognition attempt is unsuccessful, the method 600 proceeds to 650, and in case of successful iris recognition, the normal operation of the electronic device 100 is started and the iris recognition process ends.

At 650, the method 600 includes prompting the user for alternate authentication for accessing at least the part of the electronic device 100, for example, PIN, password, pattern input, or other authentication methods such as fingerprints scanning, face matching, voice recognition, etc.

At 655, the method 600 includes checking whether the alternate authentication is successful. If the user is not able to provide correct authentication, it is assumed that the user is not an authorized user of the electronic device 100, and the method 600 terminates. Further, when the user has authenticated him/her correctly, the method 600 proceeds to operation 660.

At 660, the method 600 includes prompting the user to provide one or more iris samples for improving the iris template associated with the lighting condition (Li). Thereafter, the method 600 proceeds to operation 625, and the based on the user selection, one or more iris samples are captured (in operation 630) in order to improve/refine the iris template associated with the lighting condition (Li).

In another example embodiment, if at operation 615, it is detected that the electronic device 100 does not have the information of iris sample in the lighting condition (Li), the method 600 does not immediately prompt for the alternate authentication, instead the method 600 prompts the user to provide one or more iris samples (S1, S2, S3) in the lighting condition (Li). Further, as a next step, the user is promoted to validate his/her authenticity by providing alternate authentication input; and only after a successful alternate authentication, the one or more iris samples (S1, S2, S3) are stored in the existing iris template associated with the lighting condition (Li) for improving the existing iris template associated with the lighting condition (Li).

Some example embodiments of methods of improving iris recognition in electronic devices are described herein with references to FIGS. 5 and 6. Any of the disclosed methods can be implemented using software comprising computer-executable instructions stored on one or more computer-readable media (e.g., non-transitory computer-readable media, such as one or more optical media discs), volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 7:
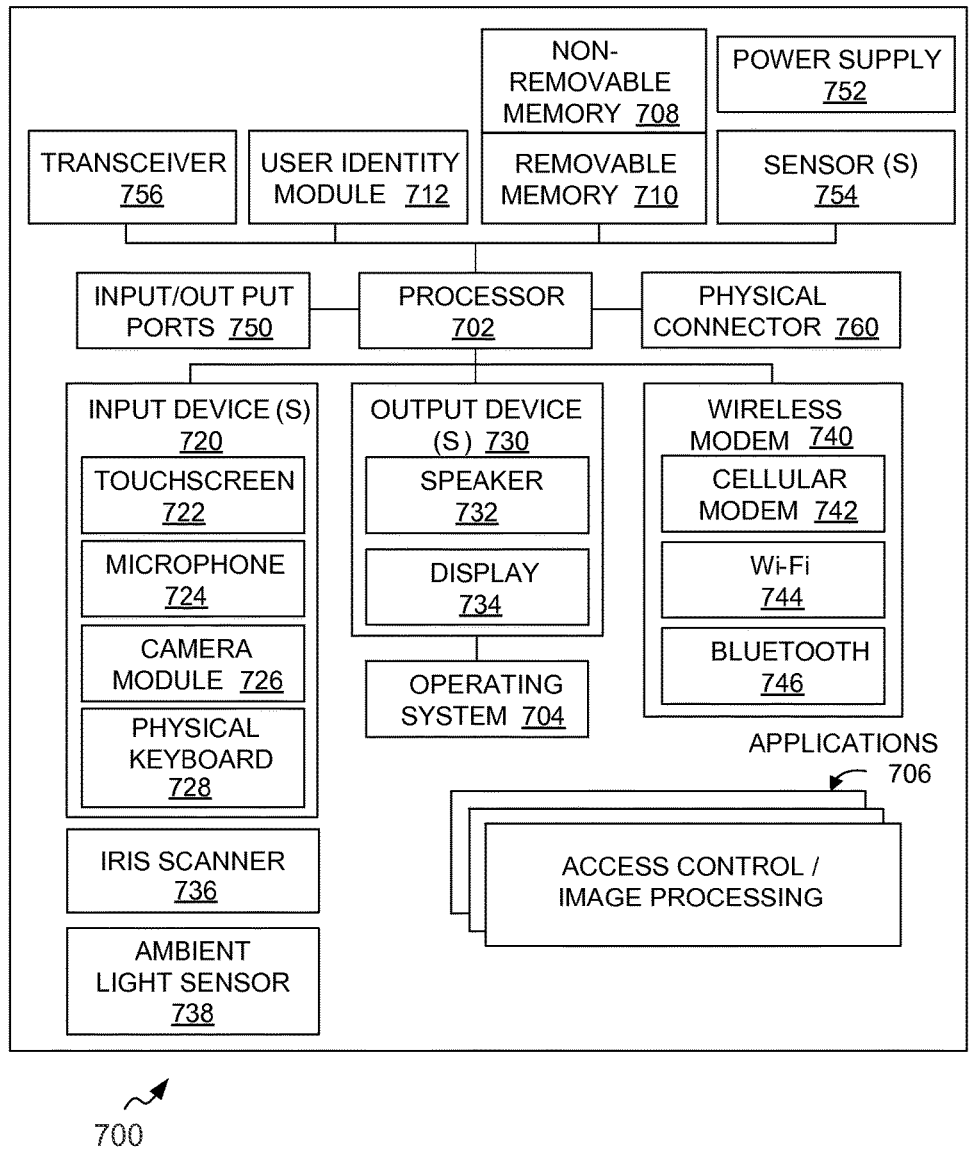
FIG. 7 illustrates an example of a mobile device capable of implementing example embodiments described herein.

Referring now to FIG. 7, a schematic block diagram of a mobile device 700 is shown that is an example of the electronic device 100. It should be understood that the mobile device 700 as illustrated and hereinafter described is merely illustrative of one type of device and should not be taken to limit the scope of the embodiments. As such, it should be appreciated that at least some of the components described below in connection with the mobile device 700 may be optional and thus in an example embodiment may include more, less or different components than those described in connection with the example embodiment of FIG. 7. As such, among other examples, the mobile device 700 could be any of mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 700 includes a controller or a processor 702 (e.g., a signal processor, microprocessor, ASIC, or other control and processing logic circuitry) for performing tasks such as signal coding, data processing, image processing, input/output processing, power control, and/or other functions. An operating system 704 controls the allocation and usage of the components of the mobile device 700 and provides support for one or more applications programs (see, access control/image processing application 706) associated with access control of the mobile device 700 or of any application installed on the mobile device 700 that implements one or more of the innovative features described herein. In addition to access control/image processing application, the application programs can include image capturing applications, common mobile computing applications (e.g., telephony applications, email applications, calendars, contact managers, web browsers and messaging applications) or any other computing application.

The illustrated mobile device 700 includes one or more memory components, for example, a non-removable memory 708 and/or removable memory 710. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. Example of data can include web pages, text, images, sound files, image data, video data, or other data sets to be sent to and/or received from one or more network servers or other devices via one or more wired or wireless networks. The mobile device 700 may further include a user identity module (UIM) 712. The UIM 712 may be a memory device having a processor built in. The UIM 712 may include, for example, a SIM, a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The mobile device 700 can support one or more input devices 720 and one or more output devices 730. Examples of the input devices 720 may include, but are not limited to, a touch screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to a speaker 732 and a display 734. Other possible output devices (not shown) can include piezoelectric or other haptic output devices. Some devices can serve more than one input/output function. For example, the touch screen 722 and the display 734 can be combined into a single input/output device.

In an embodiment, the camera module 726 may include a digital camera capable of forming a digital image file from a captured image. In some implementations, the camera module 726 may include two or more cameras, for example, a front camera and a rear camera positioned on two sides of the mobile device 700 (e.g., in a mobile device). As such, the camera module 726 includes all hardware, such as a lens or other optical component(s), and software for creating a digital image file from a captured image. Alternatively, the camera module 726 may include the hardware needed to view an image, while a memory device of the mobile device 700 stores instructions for execution by the processor 702 in the form of software to create a digital image file from a captured image. In an example embodiment, the camera module 726 may further include a processing element such as a co-processor, which assists the processor 702 in processing image data and an encoder and/or decoder for compressing and/or decompressing image data. In an embodiment, the camera module 726 may provide live image data (or viewfinder image data) to the display 734.

The mobile device 700 also includes components for iris recognition of users of the mobile device. For instance, the mobile device 700 includes an iris scanner 736 for capturing iris samples of the user's iris. The mobile device 700 also includes an ambient light sensor 738 for measuring lighting condition in the surroundings of the mobile device 700. The iris scanner 736 works in coordination with the processor 702 and the camera module 726 for example, a front camera.

A wireless modem 740 can be coupled to one or more antennas (not shown) and can support two-way communications between the processor 702 and external devices, as is well understood in the art. The wireless modem 740 is shown generically and can include, for example, a cellular modem 742 for communicating at long range with the mobile communication network, a Wi-Fi-compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the mobile device and a public switched telephone network (PSTN).

The mobile device 700 can further include one or more input/output ports 750, a power supply 752, one or more sensors 754 for example, an accelerometer, a gyroscope, a compass, or an infrared proximity sensor for detecting the orientation or motion of the mobile device 700, a transceiver 756 (for wirelessly transmitting analog or digital signals) and/or a physical connector 760, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the mobile device 700 can implement the technologies described herein. For example, the processor 702 can facilitate capture of images or image frames of a scene through the camera module 726 and perform post-processing of the captured image frames.

Although the mobile device 700 is illustrated in FIG. 7 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of an electronic device comprises
an iris scanner for capturing iris samples of a user's iris;
an ambient light sensor for measuring lighting condition in surroundings of the electronic device;
a memory comprising computer program code for providing access control to at least a part of the electronic device to a user by using at least iris recognition of the user's iris; and
a processor communicably coupled with the memory, the ambient light sensor and the iris scanner, the processor configured to execute the computer program code to cause the electronic device to:
prompt the user to provide one or more iris samples of the user's iris to the iris scanner in a particular lighting condition measured by the ambient light sensor in occurrence of at least one of a first event and a second event,
wherein the first event occurs if the processor determines at least a missing information associated with an iris sample in the particular lighting condition in the electronic device; and
wherein the second event occurs if the processor detects an unsuccessful iris recognition attempt for accessing at least the part of the electronic device by the user in the particular lighting condition.

In one embodiment of the electronic device the iris scanner comprises an infrared camera and a light emitting diode, the infrared camera and the light emitting diode together configured to capture the one or more iris samples upon detecting at least one of user's eyes in a field of view of the infrared camera.

In one embodiment of the electronic device, alternatively or in addition, the processor is further configured to cause the electronic device to:
prompt the user for providing an alternate authentication input upon capturing the one or more iris samples upon the occurrence of the second event; and
store the one or more captured iris samples in form of an iris template associated with the particular lighting condition if the alternate authentication input provided by the user is correct.

In one embodiment of the electronic device, alternatively or in addition, the alternate authentication input comprises a pin number.

In one embodiment of the electronic device, alternatively or in addition, the processor is further configured to cause the iris scanner to capture a plurality of cleanup shots of the user's iris and is further configured to store the plurality of cleanup shots in an iris template associated with the particular lighting condition.

In one embodiment of the electronic device, alternatively or in addition, the iris scanner is further configured to capture each iris sample of the one or more iris samples by capturing a plurality of iris shots of the user's iris.

In one embodiment of the electronic device, alternatively or in addition, the device further comprises a camera module synchronized with the iris scanner, wherein the processor is configured to cause the electronic device to show a viewfinder image of the user's eyes to guide the user's eyes in the field of view of the infrared camera for capturing the one or more iris samples.

In one embodiment of the electronic device, alternatively or in addition, the processor is configured to detect the unsuccessful iris recognition attempt by:
capturing at least one iris shot of the user's iris upon detecting an access attempt of the user for accessing at least the part of the electronic device; and
matching the at least one captured iris shot with an existing iris template associated with the particular lighting condition, wherein the unsuccessful iris recognition attempt is detected if a mismatch between the at least one iris shot and the existing iris template is greater than a pre-defined degree of mismatch.

In one embodiment of the electronic device, alternatively or in addition, the one or more iris samples of the user's iris comprises one or more iris samples of at least one of a left eye and a right eye of the user.

In one embodiment of the electronic device, alternatively or in addition, the electronic device is a mobile phone.

An embodiment of a method comprises detecting an access attempt of a user for accessing at least a part of an electronic device;
measuring a lighting condition, by an ambient light sensor, in surroundings of the electronic device; and
upon detecting an occurrence of at least one of a first event and a second event by a processor in the electronic device, prompting the user to provide one or more iris samples of user's iris to an iris scanner of the electronic device in a particular lighting condition measured by the ambient light sensor;
wherein the first event occurs if the ambient light sensor detects the particular lighting condition in the surroundings of the electronic device, and at least a missing information associated with an iris sample in the particular lighting condition is detected in the electronic device; and
wherein the second event occurs if an unsuccessful iris recognition attempt of the user is detected in the particular lighting condition for accessing at least the part of the electronic device.

In one embodiment the method comprises capturing the one or more iris samples in the particular lighting condition and storing the one or more captured iris samples in form of an iris template associated with the particular lighting condition.

In one embodiment of the method, alternatively or in addition, upon detecting the occurrence of the second event, the method further comprises:
prompting the user for providing an alternate authentication input to the electronic device for accessing at least the part of the electronic device upon capturing the one or more iris samples; and
storing the one or more captured iris samples in form of the iris template associated with the particular lighting condition if the alternate authentication input provided by the user is correct.

In one embodiment the method further comprises, alternatively or in addition,
capturing a plurality of cleanup shots of the user's iris; and storing the plurality of cleanup shots in the iris template associated with the particular lighting condition.

In one embodiment of the method, alternatively or in addition, capturing each iris sample of the one or more iris samples comprises capturing a plurality of iris shots of the user's iris.

In one embodiment of the method, alternatively or in addition, capturing an iris sample of the one or more iris samples comprises,
providing a viewfinder image of user's eyes for guiding the user to adjust position of the user's eyes in a field of view of an infrared camera of the iris scanner.

In one embodiment of the method, alternatively or in addition, detecting the unsuccessful iris recognition attempt comprises:
capturing at least one iris shot of the user's iris upon detecting the access attempt of the user for accessing at least the part of the electronic device; and
matching the at least one captured iris shot with an existing iris template associated with the particular lighting condition, wherein the unsuccessful iris recognition attempt is detected if a mismatch between the at least one iris shot and the existing iris template is greater than a pre-defined degree of mismatch.

In one embodiment of the method, alternatively or in addition, the one or more iris samples of the user's iris comprises one or more iris samples of at least one of a left eye and a right eye of the user.

An embodiment of a computer program product comprises at least one computer-readable storage medium, the computer-readable storage medium comprising a set of instructions, which, when executed by one or more processors, cause an electronic device to at least perform:
detecting an access attempt of a user for accessing at least a part of the electronic device;
measuring a lighting condition, by an ambient light sensor, in surroundings of the electronic device; and
upon detecting an occurrence of at least one of a first event and a second event by a processor in the electronic device, prompting the user to provide one or more iris samples of user's iris to an iris scanner of the electronic device in a particular ambient lighting condition measured by the ambient light sensor;
wherein the first event occurs if the ambient light sensor detects a particular lighting condition in the surroundings of the electronic device, and at least a missing information associated with an iris sample in the particular lighting condition is detected in the electronic device; and
wherein the second event occurs if an unsuccessful iris recognition attempt of the user is detected in the particular lighting condition for accessing at least the part of the electronic device.

In one embodiment of the computer program product the at least one computer-readable storage medium is a non-transitory computer-readable storage medium.

In one embodiment of the computer program product, alternatively or in addition, the electronic device is further caused to at least perform:

prompting the user for providing an alternate authentication input upon capturing the one or more iris samples upon the occurrence of the second event; and storing the one or more captured iris samples in form of an iris template associated with the particular lighting condition if the alternate authentication input provided by the user is correct.

Various example embodiments offer, among other benefits, techniques for improvement in iris recognition in electronic devices. Various embodiments are capable of improving the iris recognition by actively prompting the user to register iris samples in different lighting conditions encountered in the usage of the electronic device. As per various embodiments of the present disclosure, the electronic device employs an ambient light sensor to precisely measure the lighting condition. Further, if the iris samples in the measured lighting conditions are already not present in the electronic devices, the user is prompted for registering iris samples in the measured lighting condition, thereby training the electronic device to offer iris recognition in the measured lighting condition that was initially not available in the electronic device. Similarly, various example embodiments provide improvements in the existing iris samples in the measured lighting conditions, if the electronic device is denied access in the measured lighting condition.

Furthermore, various example embodiments may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium, for example in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be deleted from or added to any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of example embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic device, comprising:
an iris scanner for capturing iris samples of a user's iris;
an ambient light sensor for measuring lighting condition in surroundings of the electronic device;
a memory comprising computer program code for providing access control to at least a part of the electronic device to a user by using at least iris recognition of the user's iris; and
a processor communicably coupled with the memory, the ambient light sensor and the iris scanner, the processor configured to execute the computer program code to cause the electronic device to:
during a set up process, prompt the user to provide a plurality of iris samples in a plurality of lighting conditions to the iris scanner and store the plurality of iris samples in the memory;

detect, by the ambient light sensor, a particular lighting condition that is different from the plurality of lighting conditions; and prompt the user to provide one or more additional iris samples of the user's iris to the iris scanner in the particular lighting condition upon determining an iris sample in the particular lighting condition is missing from the plurality of iris samples, or upon detecting an unsuccessful iris recognition attempt by the user to access the at least a part of the electronic device in the particular lighting condition.

2. The electronic device of claim 1, wherein the iris scanner comprises an infrared camera and a light emitting diode, the infrared camera and the light emitting diode together configured to capture the one or more iris samples upon detecting at least one of user's eyes in a field of view of the infrared camera.

3. The electronic device of claim 2, wherein the processor is further configured to cause the electronic device to:
  prompt the user for providing an alternate authentication input upon capturing the one or more additional iris samples upon the occurrence of the second event; and
  store the one or more captured additional iris samples in form of an iris template associated with the particular lighting condition if the alternate authentication input provided by the user is correct.

4. The electronic device of claim 3, wherein the alternate authentication input comprises a pin number.

5. The electronic device of claim 2, wherein the processor is further configured to cause the iris scanner to capture a plurality of cleanup shots of the user's iris and is further configured to store the plurality of cleanup shots in an iris template associated with the particular lighting condition.

6. The electronic device of claim 2, wherein the iris scanner is further configured to capture each iris sample of the one or more additional iris samples by capturing a plurality of iris shots of the user's iris.

7. The electronic device of claim 2, further comprising a camera module synchronized with the iris scanner, wherein the processor is configured to cause the electronic device to show a viewfinder image of the user's eyes to guide the user's eyes in the field of view of the infrared camera for capturing the one or more iris samples.

8. The electronic device of claim 7, wherein the processor is configured to detect the unsuccessful iris recognition attempt by:
  capturing at least one iris shot of the user's iris upon detecting an access attempt of the user for accessing at least the part of the electronic device; and
  matching the at least one captured iris shot with an existing iris template associated with the particular lighting condition, wherein the unsuccessful iris recognition attempt is detected if a mismatch between the at least one iris shot and the existing iris template is greater than a pre-defined degree of mismatch.

9. The electronic device of claim 1, wherein the one or more additional iris samples of the user's iris comprises one or more iris samples of at least one of a left eye and a right eye of the user.

10. The electronic device of claim 1, wherein the electronic device is a mobile phone.

11. A method, comprising:
  prompting, during a set up process, a user to provide a plurality of iris samples in a plurality of lighting conditions to an iris scanner and storing the plurality of iris samples in a memory;
  detecting an access attempt by the user to access at least a part of an electronic device;
  measuring a particular lighting condition, by an ambient light sensor, that is different from the plurality of lighting conditions; and
  prompting the user to provide one or more additional iris samples of the user's iris to the iris scanner of the electronic device in the particular lighting condition upon detecting an iris sample
  in the particular lighting condition is missing from the plurality of iris samples in the memory, or upon detecting
  an unsuccessful iris recognition attempt by the user in the particular lighting condition to access the at least a part of the electronic device.

12. The method of claim 11, further comprising capturing the one or more additional iris samples in the particular lighting condition and storing the one or more captured iris samples in form of an iris template associated with the particular lighting condition.

13. The method of claim 12, upon detecting the occurrence of the second event, further comprising:
  prompting the user for providing an alternate authentication input to the electronic device for accessing at least the part of the electronic device upon capturing the one or more additional iris samples; and
  storing the one or more captured iris samples in form of the iris template associated with the particular lighting condition if the alternate authentication input provided by the user is correct.

14. The method of claim 12, further comprising:
  capturing a plurality of cleanup shots of the user's iris; and
  storing the plurality of cleanup shots in the iris template associated with the particular lighting condition.

15. The method of claim 12, wherein capturing each iris sample of the one or more additional iris samples comprises capturing a plurality of iris shots of the user's iris.

16. The method of claim 12, wherein capturing an iris sample of the one or more additional iris samples comprises,
  providing a viewfinder image of user's eyes for guiding the user to adjust position of the user's eyes in a field of view of an infrared camera of the iris scanner.

17. The method of claim 11, wherein detecting the unsuccessful iris recognition attempt comprises:
  capturing at least one iris shot of the user's iris upon detecting the access attempt of the user for accessing at least the part of the electronic device; and
  matching the at least one captured iris shot with an existing iris template associated with the particular lighting condition, wherein the unsuccessful iris recognition attempt is detected if a mismatch between the at least one iris shot and the existing iris template is greater than a pre-defined degree of mismatch.

18. The method of claim 11, wherein the one or more iris additional samples of the user's iris comprises one or more iris samples of at least one of a left eye and a right eye of the user.

19. A computer program product comprising at least one computer-readable storage memory, the computer-readable storage memory comprising a set of instructions, which, when executed by one or more processors, cause an electronic device to at least perform:
  prompting, during a set up process, a user to provide a plurality of iris samples in a plurality of lighting conditions to an iris scanner and storing the plurality of iris samples in a memory;

detecting, by an ambient light sensor, a particular lighting condition that is different from the plurality of lighting conditions; and prompting the user to provide one or more additional iris samples of the user's iris to the iris scanner of the electronic device in the particular lighting condition upon detecting an iris sample in the particular lighting condition is missing from the plurality of iris samples, or upon detecting an unsuccessful iris recognition attempt by the user in the particular lighting condition to access at least a part of the electronic device.

20. The computer program product of claim 19, wherein the electronic device is further caused to at least perform:

prompting the user for providing an alternate authentication input upon capturing the one or more additional iris samples upon the occurrence of the second event; and storing the one or more captured iris samples in form of an iris template associated with the particular lighting condition if the alternate authentication input provided by the user is correct.

* * * * *